United States Patent [19]

Fish

[11] 4,443,925
[45] Apr. 24, 1984

[54] METHOD OF SEPARATING PARTS OF A PLASTIC BOTTLE

[75] Inventor: Floyd H. Fish, Wilmington, Del.

[73] Assignee: E. I. Du Pont de Nemours and Company, Wilmington, Del.

[21] Appl. No.: 224,686

[22] Filed: Jan. 13, 1981

[51] Int. Cl.³ .............................................. B23P 19/00
[52] U.S. Cl. .................................. 29/426.4; 29/426.2; 29/403.3; 83/54; 83/425; 83/444; 83/871
[58] Field of Search .................... 83/54, 870, 871, 872, 83/444, 923, 425.2, 873; 225/93, 97; 29/678, 403.1, 426.2, 426.4, 403.3

[56] References Cited

U.S. PATENT DOCUMENTS

| 1,389,270 | 8/1921 | Pratt | 83/873 |
| 2,319,198 | 5/1943 | Barrens | 83/408 X |
| 3,172,588 | 3/1965 | Bertold | 225/93 |
| 3,555,952 | 7/1971 | Gruber | 83/444 |
| 3,563,121 | 2/1971 | Cox | 83/444 |
| 4,013,497 | 3/1977 | Wolf | 156/154 |
| 4,179,963 | 12/1979 | Rhodes | 83/425.2 |

FOREIGN PATENT DOCUMENTS 2244347  3/1974  Fed. Rep. of Germany .......... 83/54

*Primary Examiner*—Leon Gilden

[57] ABSTRACT

In preparation for reclaiming and recycling the material of construction of a plastic bottle, the friction-fitting base, if any, and bottle cap can be separated from the bottle body by cutting through the cap and base. The cap and base are cut in a plane in which the bottle's longitudinal axis lies. Alternatively, two cuts are made in parallel planes that are also parallel to the bottle's longitudinal axis.

5 Claims, 6 Drawing Figures

METHOD OF SEPARATING PARTS OF A PLASTIC BOTTLE

BACKGROUND OF THE INVENTION

1. Field of the Invention

This invention relates to a method of separating the cap and base from a plastic bottle as a preliminary step to reprocessing the plastic used to make the body of the bottle.

2. Description of the Prior Art

The plastic bottles or containers used in recent times to package soft-drinks and the like have become popular because of their easy disposability by the consumer. Nevertheless, the plastic used in making the body of the bottle can often be reclaimed and reprocessed for other uses, such as extrusion into fibers.

The body plastic must ultimately be pure to be reprocessed. Accordingly, it must be separated from the other non-plastic parts of the bottle, such as an aluminum cap or paper label, and even from parts of the bottle, such as a friction-fitting base which many such bottles have, made from a different plastic. Various methods of effecting this separation are currently in use, but these all suffer from high cost and complexity or from low speed. One such method involves actually unscrewing the cap and pulling off the base either manually or through automation. The body plastic is then ground and reprocessed. Another method involves grinding the entire bottle and then chemically or physically separating the desired ground body plastic from the ground aluminum of the caps and other ground material of the base. This method is obviously complex and costly.

Therefore, there remains a need for a relatively simple, high-speed, and inexpensive method of separating the parts of a plastic bottle for subsequent reprocessing.

SUMMARY OF THE INVENTION

There is provided by the present invention, a method of removing a part from a plastic bottle comprising the steps of cutting the bottle in at least one plane in which the bottle's longitudinal axis lies such that the cut is extended at least completely through the part to be removed, and optionally, vibrating the bottle to separate any cut part which has not separated itself spontaneously from any other part after said cutting step.

There is further provided a second method of removing a part from a plastic bottle comprising the steps of cutting through the bottle in at least two planes that are parallel to each other and to the bottle's longitudinal axis, said axis being between two of said cutting planes, such that the cuts extend at least completely through the part to be removed, and optionally, vibrating the bottle to separate any cut part which has not separated itself spontaneously from any other part after said cutting step.

DETAILED DESCRIPTION OF THE INVENTION

The present invention relates to a method of removing individual parts from a used plastic bottle assembly so that the plastic material which forms the body of the bottle, the base cup, and the metal cap, all of which form the assembly, can be more easily recovered and reprocessed individually.

Figure 1:
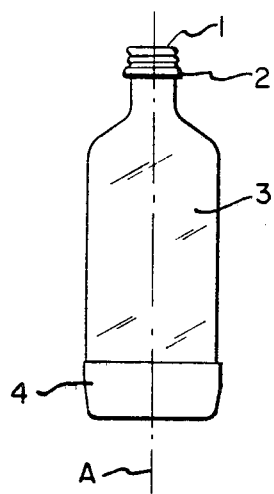
FIG. 1 is a plan view of a plastic bottle to which the method of the present invention pertains.

The typical plastic bottle, prevalent in modern packaging, is shown in FIG. 1 to comprise a main body portion 3 having a cap 1 secured to the body by a threaded portion 2 which engages a corresponding threaded portion, not shown, at the open neck of the bottle. The bottom portion of the plastic bottle, because of the manner by which such bottles are formed, is usually not flattened so that the bottom is normally encased in a friction-fitting base 4 which allows the bottle to stand upright.

The method of the present invention is applicable to plastic bottles of any construction that have at least one part that is desirably removed prior to reprocessing. For example, one commercially used bottle as in FIG. 1 has a body 3 of polyethylene terephthalate, a base 4 of low density polyethylene, and an aluminum cap 1, that is often still present when the bottle is to be reprocessed. The present invention provides a method of separating the low-density polyethylene and the aluminum from the plastic body prior to any reprocessing steps. It is to be understood that the polyethylene base or aluminum cap may also be reclaimed, and the separation effected by the present invention has benefits in this regard also. It should be further understood that the invention is not limited to operation on polyethylene terephthalate bottles, but rather it can apply to any plastic bottle, this specific material being cited by way of example only.

The present invention involves cutting the bottle in at least one plane that contains the bottle's longitudinal axis, shown as dotted line A in FIG. 1. With respect to the bottle of FIG. 1, for instance, any such cut should be at least deep enough to extend completely through the cap at one end and the base at the other end. This can be accomplished either by a separate cut at each end, or by a single cut completely through the bottle from cap to base. To simplify explanation herein, the invention will most often be described in terms of cutting completely through the bottle. It is to be understood, however, that the descriptions apply equally to the case in which a separate cut is made at either end or both ends, extending only so far as is necessary to cut through the cap or the base.

Figure 2:
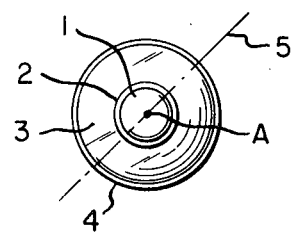
FIG. 2 is a top view of the bottle of FIG. 1 indicating a cutting plane.

The bottles to which the present method applies are of circular cross-section, and the method takes advantage of the fact that when the cap and base are cut as described above, they will have a cross-sectional grip of no more than 180° and will therefore fall off the body of the bottle either spontaneously or after slight vibration or tapping. This is illustrated through FIG. 2 in which a top view of the bottle of FIG. 1 is provided. As shown in FIG. 2, a saw 5, seen only edgewise in this top view, cuts the bottle in a plane whose edge is represented by saw 5. The saw can be of any type, but use of a rotating circular saw or a chain saw, for instance, is preferred when the bottle-cutting is to be performed in a continuous manner, as described below.

In FIG. 2, the saw is positioned to cut the bottle diametrically through its circular cross-section. As can be seen, the cutting plane contains the bottle's longitudinal axis A, appearing only as a point A in this top view, and the cut will cause the cap 1, for example, to retain only a 180° cross-sectional grip on the neck of the bottle. This should cause the cap to fall away from the neck of the bottle spontaneously or after slight vibration, as explained below.

Figure 3:
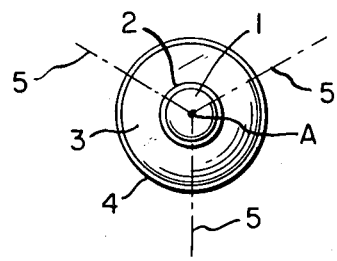
FIG. 3 is a top view of the bottle of FIG. 1 showing another embodiment of the present invention indicating cuts to be made along three planes.

In another embodiment of the invention, shown in FIG. 3, three planar cuts are made longitudinally through the bottle by three circular saws 6, which are seen edgewise in the figure. The saws operate in close proximity to each other, and the bottle's longitudinal axis A, seen as point A in the figure, is tangential to each circular saw 6. As such, the plane in which each circular saw 6 lies, would, if extended, contain longitudinal axis A. In the actual practice of this embodiment, the bottle is longitudinally brought into contact with saws 6 so that the saws and bottle are positioned as indicated. Saws 6 are positioned at approximately 120° to each other so that the bottle will have three radial cuts through its circular cross-section, leaving the cap and base with only a 120° cross-sectional grip on any part of the bottle. This positioning is more likely to cause the cut cap and base to fall away spontaneously from the bottle than is the positioning of the single saw in FIG. 2. Accordingly, with the three radial cuts shown in FIG. 3, the optional vibrating step, discussed below, will normally not be necessary.

Figure 4:
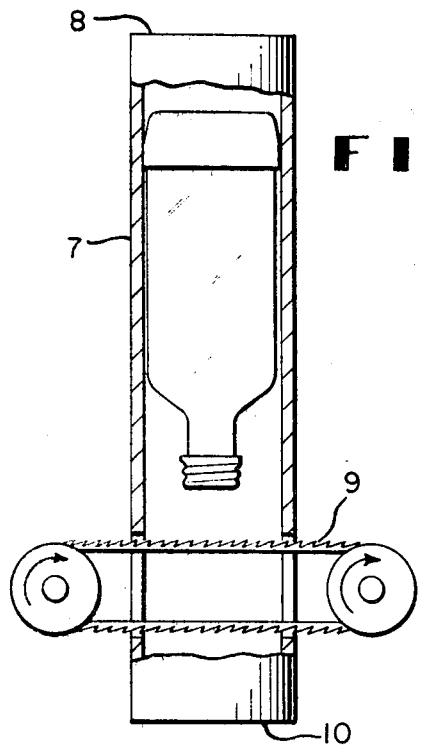
FIG. 4 is a cut-away plan view of a system by which the cut shown in FIG. 2 can be achieved.

FIG. 4 illustrates one method by which a bottle can be cut diametrically through its circular cross-section. A pipe 7 having an inside diameter only slightly larger than the largest cross-sectional diameter of the bottle is vertically positioned to receive bottle through its upper end. The bottles can be fed continuously to the pipe either manually or automatically by, for example, any commercially available orienting conveyor. In either event, the bottles will travel by gravity, either cap first as shown or base first, into contact with a power chain saw 9 whose cutting edge is diametrically across the interior of the pipe. Alternatively, a power band saw, positioned so that only a single cutting edge is within the pipe, can also be used. In practice, the bottle will be pushed through the pipe and past the saw by the weight of the other bottles immediately behind it, although normally a bottle's own weight will provide sufficient downward motion. The bottle is cut longitudinally in half by the saw and the halves pass by the saw on either side and leave pipe 8 through lower opening 10.

Normally at this point, the cut portions of the cap and base will spontaneously separate from the cut bottle body, to which each was previously secured. Accordingly, the lower end of the pipe can discharge directly to a conventional oscillating conveyer screen by which the cut pieces of cap, base, and bottle body, which are of conveniently different size from each other, can be selectively directed to different collection points for further processing.

In an alternative embodiment of FIG. 4, the inside diameter of pipe 7 is sufficiently large to allow the bottle to clatter against the walls of the pipe but the pipe is still sufficiently restricting to keep the bottle substantially vertically positioned. The clattering aids in the separation of the cut portions of the cap and base from the body of the bottle.

Where the cutting operation does not result in the spontaneous separation of the cut cap or base from the body of the bottle, the method of the present invention employs an additional step wherein the parts of the bottle body and the cap or base, which have been cut in half but which are not yet separated from the body, are vibrated. It has been found that such a vibrating step quickly causes the cut parts to separate. In the method described in conjunction with FIG. 4, the vibrating step is conveniently performed, for example, by positioning pipe 7 such that its lower opening 10 discharges to a vibrating planar surface. On such surface, not shown, the desired separation takes place. The vibrating surface may be tilted slightly from its usual horizontal position such that the cut pieces slide therefrom to the aforementioned oscillating conveyor screen where further separation can proceed as previously described. It is to be understood that the manner in which the vibrating step is performed is not critical, and the step, where necessary, can therefore be performed by any appropriate means, the vibrating planar surface being cited only as an example. In another example, the bottle pieces can be fed into a vibrating hopper from which the separated parts can be subsequently removed for further processing.

The gravity feed of bottles through a vertically oriented pipe, as described with FIG. 4, can also be easily adapted for use with the three-saw cutting arrangement shown in FIG. 3. In such an embodiment of the present invention, each of the three circular saws, in relative positions as described above, can partially extend into the interior of the pipe through a vertical slit in the pipe wall such that the center-line of the pipe is tangent to each saw. Since the interior diameter of the pipe is just large enough to allow the bottle to pass therethrough, the longitudinal axis of the bottle will coincide with the center-like of the pipe. The bottle, cut by the saws into thirds, passes by the saws and exits the pipe, from which point the operation of the invention is otherwise as described with respect to FIG. 4.

Figure 5:
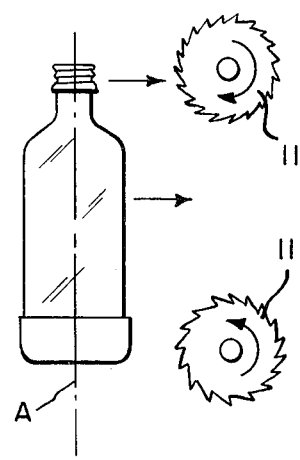
FIG. 5 is a schematic view of another embodiment of the invention.

The embodiment of the invention schematically shown in FIG. 5 is one in which the ends of the bottle are cut simultaneously, but only as deep as is necessary to cut completely through the cap and base. As shown in FIG. 5, the bottle is advanced in the indicated direction towards two circular saws 11 rotating as shown. The direction of advancement of the bottle is perpendicular to its longitudinal axis A, which axis is contained in the same plane as that in which both saws lie. Accordingly, when the bottle passes by the saws, the bottle is cut at each end, both cuts being in a plane which contains the bottle's longitudinal axis, similar to the position described in FIG. 2. In the embodiment, the cap and base will be cut in half such that each half thereof has a 180° cross-sectional grip on the bottle body, which will remain intact except for slits at either and corresponding to the passage of the saws.

One example by which the embodiment of FIG. 5 can be put into practice is to grip the bottle between two moving, facing belts having molded surfaces that hold the bottle so that its longitudinal axis is perpendicular to the direction of movement of the belts. Saws 11 are positioned between the belts, equidistant from each, so that the saws and bottle are positioned relative to each other as shown in FIG. 5 and as described above.

Once beyond the saws, the bottles can be discharged from the belts directly to a vibrating surface, as earlier described, to separate from the bottle body any cut parts of the cap or base that did not spontaneously separate.

Figure 6:
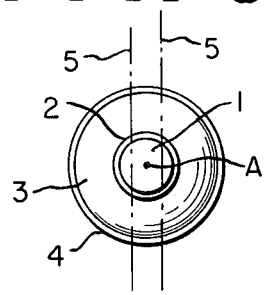
FIG. 6 is a top view of the bottle of FIG. 1 indicating two parallel cutting planes.

In yet another embodiment of the present invention, shown in FIG. 6, two planar cuts 5 are made longitudinally through a bottle such as the one described in connection with FIG. 1. The cuts are made, for example, by two circular saws 5 which are seen edgewise in the figure. In this embodiment, neither cutting plane is one in which the bottle's longitudinal axis lies, but the axis, seen as point A in the figure, is parallel to each cutting plane and lies between them. As can be seen, the cuts will cause each resulting portion of cap 1 or base 4 to retain less than a 180° cross-sectional grip on the body of the bottle, allowing such portions to fall away from the bottle spontaneously.

As described earlier, with respect to the other embodiments of the present invention, the cuts should be at least deep enough to extend through cap 1 at one end and base 4 at the other end. This can be accomplished either by a separate pair of cuts at each end, or by a single pair of cuts completely through the bottle from cap to base. When a separate pair of cuts is made at either or both ends, each pair of cuts need only longitudinally extend as far as is necessary to cut through the part to be removed.

What is claimed is:

1. A method of separating material components of a plastic bottle assembly, said plastic bottle assembly comprising a main body portion of a first plastic material, said main body portion being generally symmetrical about a longitudinal axis and having attached thereto at least one part of a material other than said first plastic material, said method comprising removing said at least one part from said main body portion by cutting said plastic bottle assembly in at least one plane in which said longitudinal axis lies such that the cut is extended completely through said at least one part, and
    optionally, vibrating said main body portion to separate therefrom any portion of said at least one part which has not separated from said main body portion after said cutting.

2. The method of claim 1 in which said at least one part a metal cap threadedly engaged to said main body portion, or a base portion of a second plastic material frictionally engaged to said main body portion, or both said metal cap and said base portion.

3. The method of claim 2 in which said plastic bottle assembly is cut in three planes that intersect at said longitudinal axis and that form angles of 120° with each other.

4. A method of separating material components of a plastic bottle assembly, said plastic bottle assembly comprising a main body portion of a first plastic material, said main body portion being generally symmetrical about a longitudinal axis and having attached thereto at least one part of a material other than said first plastic material, said method comprising removing said at least one part from said main body portion by cutting said plastic bottle assembly in at least two planes that are parallel to each other and to said longitudinal axis, said longitudinal axis being between two of said cutting planes, such that the cuts extend completely through said at least one part, and
    optionally, vibrating said main body portion to separate therefrom any portion of said at least one part which has not separated from said main body portion after said cutting.

5. The method of claim 4 in which said at least one part a metal cap threadedly engaged to said main body portion, or a base portion of a second plastic material frictionally engaged to said main body portion, or both said metal cap and said base portion.

* * * * *